United States Patent

Handerson et al.

(10) Patent No.: US 6,640,228 B1
(45) Date of Patent: Oct. 28, 2003

(54) METHOD FOR DETECTING INCORRECTLY CATEGORIZED DATA

(75) Inventors: Steven Kendall Handerson, Old Lyme, CT (US); Jay Michael Ponte, Burlington, MA (US)

(73) Assignee: Verizon Laboratories Inc., Waltham, MA (US)

(*) Notice: Subject to any disclaimer, the term of this patent is extended or adjusted under 35 U.S.C. 154(b) by 324 days.

(21) Appl. No.: 09/710,436

(22) Filed: Nov. 10, 2000

(51) Int. Cl.[7] ................................................. G06F 7/00
(52) U.S. Cl. ..................... 707/6; 707/1; 707/3; 707/100
(58) Field of Search ............................. 707/6, 102, 7, 707/5, 10, 100; 379/93.23

(56) References Cited

U.S. PATENT DOCUMENTS

| | | | |
|---|---|---|---|
| 5,251,131 A | 10/1993 | Masand et al. | 364/419.08 |
| 5,488,725 A * | 1/1996 | Turtle et al. | 707/5 |
| 5,675,710 A | 10/1997 | Lewis | 395/10 |
| 5,704,004 A | 12/1997 | Li et al. | 395/2.52 |
| 5,799,278 A | 8/1998 | Cobbett et al. | 704/256 |
| 5,943,670 A * | 8/1999 | Prager | 707/5 |
| 6,003,027 A * | 12/1999 | Prager | 707/5 |
| 6,137,911 A | 10/2000 | Zhilyaev | 382/225 |
| 6,161,130 A | 12/2000 | Horvitz et al. | 709/206 |
| 6,167,369 A | 12/2000 | Schulze | 704/9 |
| 6,182,083 B1 * | 1/2001 | Scheifler et al. | 707/103 R |
| 6,192,360 B1 | 2/2001 | Dumais et al. | 707/6 |
| 6,233,575 B1 * | 5/2001 | Agrawal et al. | 707/6 |
| 6,374,241 B1 * | 4/2002 | Lamburt et al. | 707/6 |
| 6,400,806 B1 * | 6/2002 | Uppaluru | 379/88.02 |
| 6,408,294 B1 * | 6/2002 | Getchius et al. | 707/5 |
| 6,466,918 B1 * | 10/2002 | Spiegel et al. | 705/27 |
| 6,466,928 B1 * | 10/2002 | Blasko et al. | 706/46 |
| 6,489,968 B1 * | 12/2002 | Ortega et al. | 345/713 |

* cited by examiner

*Primary Examiner*—Greta Robinson
*Assistant Examiner*—Miranda Le
(74) *Attorney, Agent, or Firm*—Leonard Charles Suchyta; James K. Weixel

(57) ABSTRACT

A method for detecting incorrect categorization of data includes obtaining a database containing a plurality of entry-category pairs, calculating a score for each entry-category pair that corresponds to a likelihood that the pair contains an incorrect category assignment, and verifying the correctness of the assignment based on the score. The verification step can be conducted manually. The score assists users in focusing any manual verification efforts on data that may actually contain incorrect category assignments, thereby making the verification process more efficient. The method can be used to review and correct business name and phone number listings in telephone directories.

26 Claims, 5 Drawing Sheets

Word

|  | w | ~w |
|---|---|---|
| c | - Has Word<br>- Is In Category | - Does Not Have Word<br>- Is In Category |
| ~c | - Has Word<br>- Is Not In Category | - Does Not Have Word<br>- Is Not In Category |

(row label: Category)

Fig. 5

METHOD FOR DETECTING INCORRECTLY CATEGORIZED DATA

TECHNICAL FIELD

The present invention is directed to data categorization, and more particularly to a method for detecting incorrectly categorized data that is used in directories, such as telephone directories.

BACKGROUND ART

Phone directories and other information sources containing large amounts of data often provide the data into two formats: a general listing that simply lists business names and phone numbers alphabetically (often called "white pages") and a grouped listing that lists business names and phone numbers under selected categories (often called "yellow pages"). The grouped listings usually include business names and telephone numbers that are grouped by business category so that the phone numbers for similar types of businesses are found in the same location in the phone directory.

Problems occur, however, if the category information, such as the business category of a business phone listing, is incorrect. More particularly, failure to thoroughly check the category assignment data or process for accuracy and timeliness may cause data miscategorization or categorizing of incorrect or outdated data. Categorization of telephone data is usually conducted by scanning telephone directories and using optical character recognition and/or human labor to match the data in the general listing with an appropriate category in the grouped listing. Errors may occur if, for example, the information in the general listing and the grouped listing does not match or is otherwise defective (e.g., if a phone number in the general listing belongs to a party that has gone out of business, if the same phone number is assigned to two different businesses due to irregularities in the change history of the phone number, or if a given phone number is reassigned to a business that is different than the business who previously had the same phone number). Failure to detect incorrectly categorized data may result in directories that list multiple phone numbers for the same business or assign unrelated businesses to the same category. Also, failure to delete outdated entries may further add to categorization errors.

Although manual review of the entries and categories can detect categorization assignment errors, applying the same level of review to all of the assignments is inefficient and cumbersome, particularly if the data being checked includes a large number of pairs and a relatively small number of errors.

There is a need for a method or system that can detect the existence of incorrectly categorized data so that the incorrectly categorized data can be located and fixed efficiently.

SUMMARY OF THE INVENTION

Accordingly, the present invention is directed to a method for determining the reliability of a data category assignment, and more particularly for determining the accuracy of an assignment of an entry to a given category. The method includes the steps of obtaining a database containing a plurality of entry-category pairs and calculating a score for each entry-category pair, wherein the score corresponds to a likelihood that the entry is correctly assigned to the category. The score itself can be calculated based on the relative probability between the occurrence of a particular entry-category pair and the number of occurrences of the entry and the category, separately, in the database.

In one embodiment, the method includes sorting the pairs according to the scores and generating a curve based on the calculated scores to indicate the likelihood that a given portion of the sorted pairs will contain accurately or inaccurately categorized data and/or to estimate the number of inaccurate data categorizations. The method may also include checking the pairs against an existing reference database. Once a data region having a higher likelihood of errors has been identified via the inventive system, any manual review of the data can be more efficiently targeted toward error-prone data rather than correctly categorized data.

BRIEF DESCRIPTION OF THE DRAWINGS

FIG. 5 is an explanatory diagram corresponding to the process shown in FIG. 4.

DETAILED DESCRIPTION OF THE PREFERRED EMBODIMENTS

Figure 1:
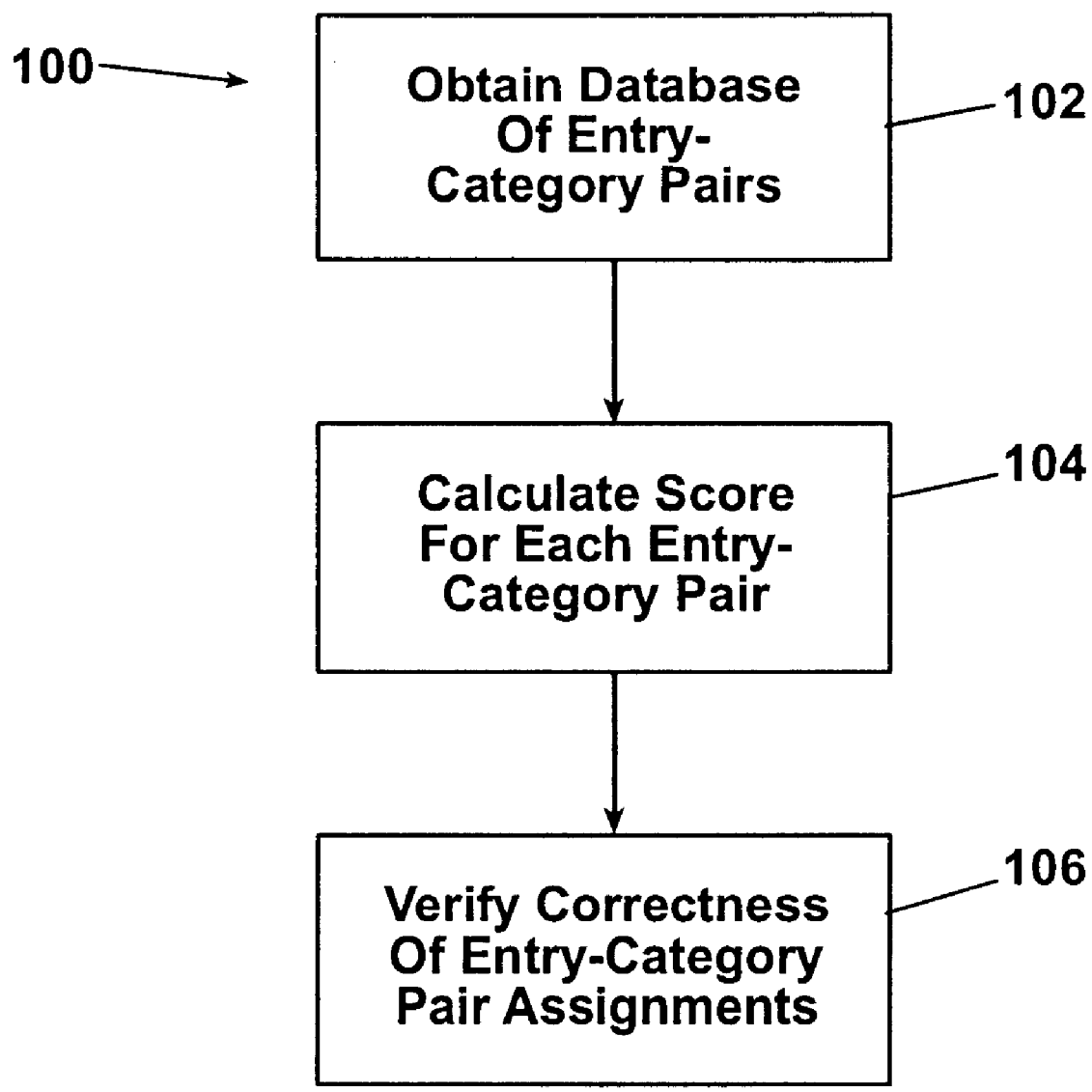
FIG. 1 is a flow diagram illustrating one embodiment of the invention.

FIG. 1 illustrates one embodiment of the inventive method 100 for detecting incorrectly categorized data. Generally, the inventive method 100 includes obtaining a database of categorized data containing a plurality of entry-category pairs 102 and calculating a score for each entry-category pair 104, wherein the score corresponds to a likelihood that the entry is correctly assigned to the category. The entries and categories in the entry-category pairs can be, for example, individual business names assigned to "yellow pages"-type business categories to form a plurality of business name-category pairs. Note that the database may contain multiple category assignments per entry and that there may be multiple entries with the same name. Also note that multiple entries with the same name may be assigned to the same category or to different categories. These factors are taken into account in the invention in determining whether entries are assigned to the correct category. Once scores are assigned to the entry-category pairs, the entry-category pairs can be reviewed at step 106 to verify the correctness of the category assignments. Each of thee steps in the method 100 will be explained in greater detail below.

The method begins by obtaining one or more databases at step 102. If a single database is used, the invention checks for internal consistencies within the database, assuming that the majority of the data is correctly categorized into entry-category pairs in the first place. More particularly, in the single database case, the method acts as an internal consistency test by checking for assignments that do not look like other assignments within the same database. Alternatively, the obtaining step 102 can test the data categorization in a test database against another database acting as a reference database. The reference database can contain information about additions or changes (e.g., a change history) to the test database.

Next, the invention generates a score at step 104 corresponding to the likelihood that the entry is assigned to the correct category. There are various ways in which the score can be generated, but generally the score should reflect the probability that a given entry, such as a business name/number, is assigned to a correct category. Two possible options will be described below.

Figure 2:
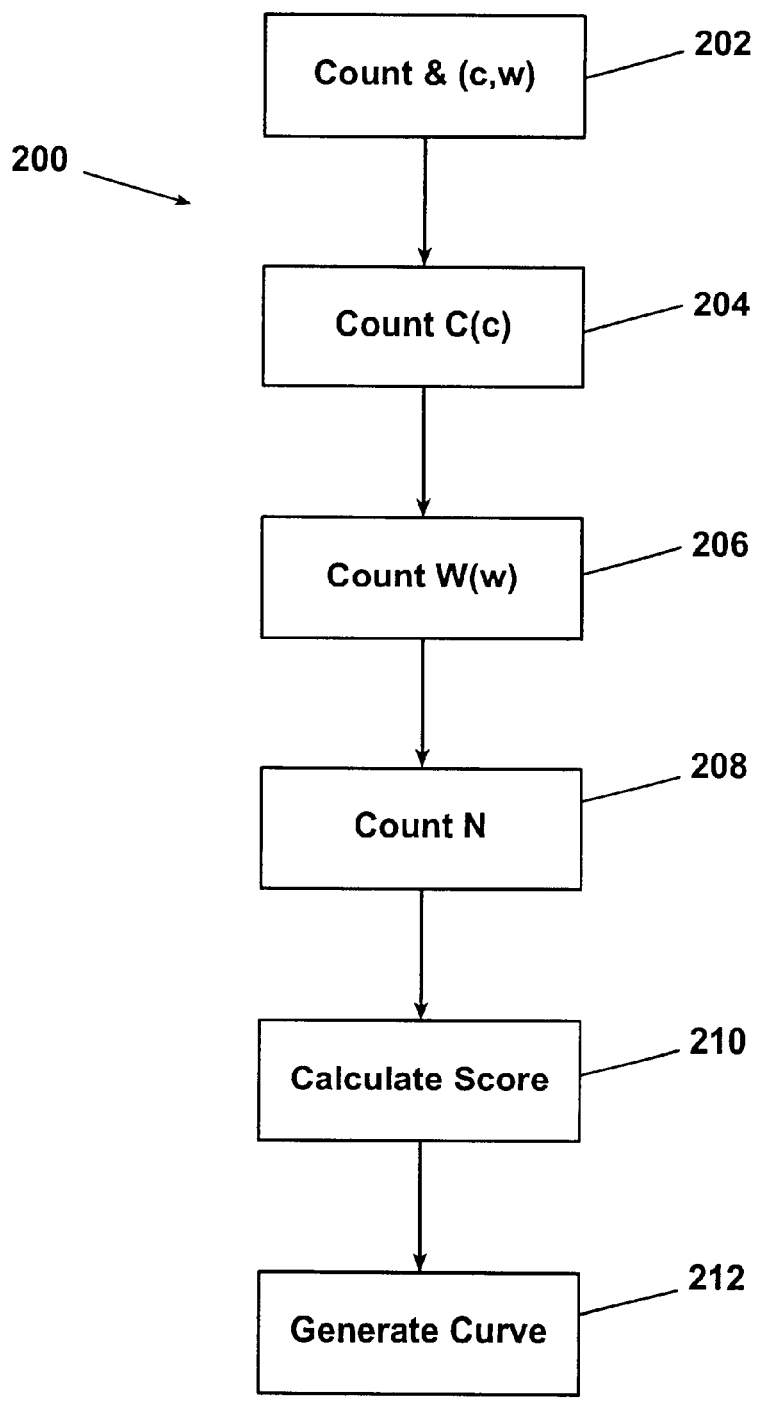
FIG. 2 is a flow diagram illustrating one embodiment of a score calculation process in the invention.
Figure 3:
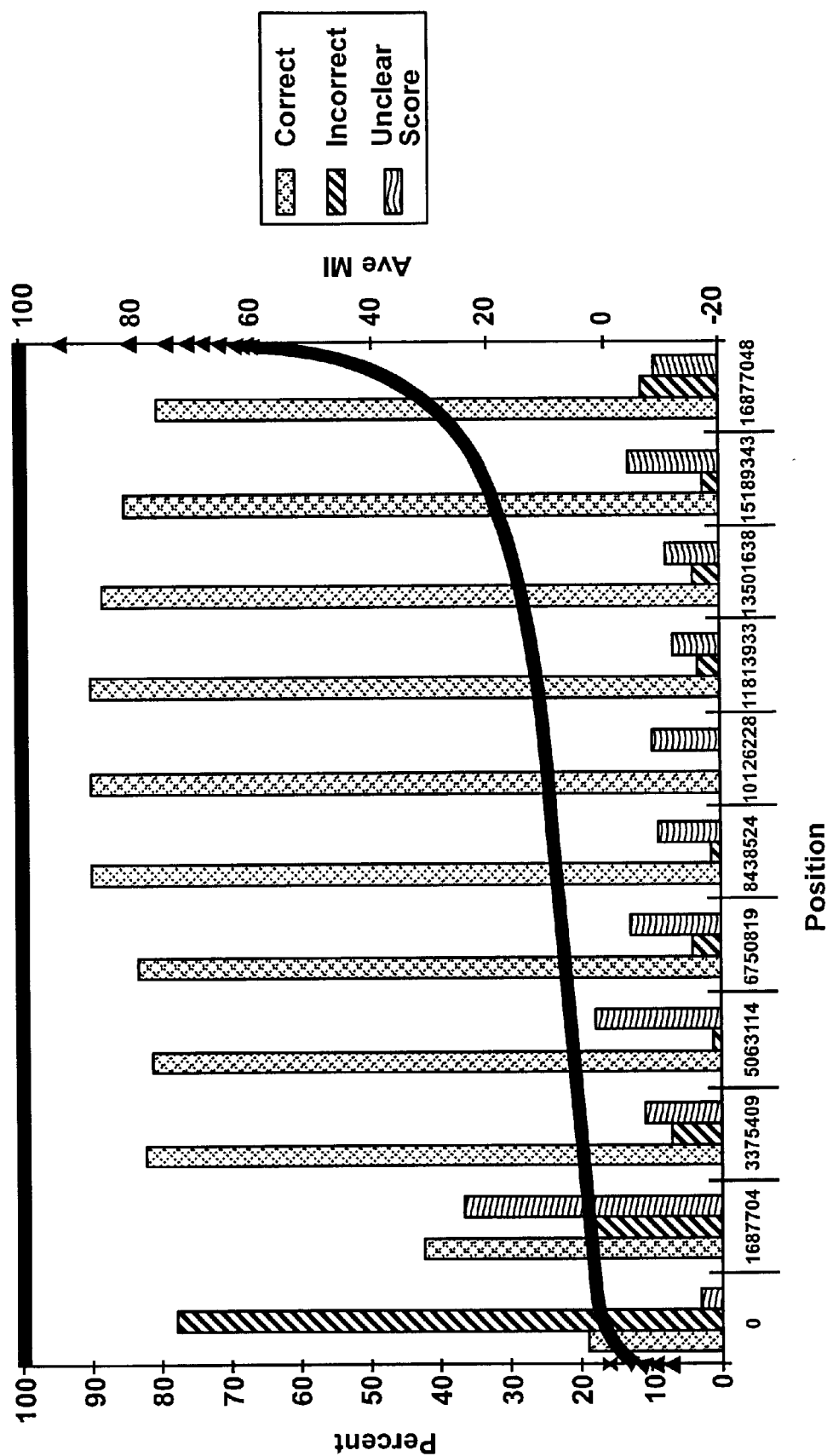
FIG. 3 is an example of a curve generated by the invention in accordance with the process shown in FIG. 2 to estimate the likelihood of incorrectly categorized data.

One option for generating a score indicating the probability of a correct or an incorrect assignment is shown in FIGS. 2 and 3. Referring to FIG. 2, the score calculation process 200 according to this embodiment first involves counting a total number of times that a given entry-category pair occurs in the database at step 202. In this specific example, the entries are referred to as "words", but the invention can evaluate any combination of letters and/or numerals in its score computation. The categories can be, for example, business categories and the entries/words can be, for example, words in a business name. The total number of times that a given category-word combination appears in the database is referred to as J(c,w).

The process also counts the number of pairs in which the given category and given word appear, regardless of whether the given category and word appear in the same pair, at steps 204 and 206, respectively. The total number of times that the given category appears is referred to as C(c), and the total number of times that the given word appears is referred to as W(w). Note that according to this counting process, categories having associated entries with more words will have a higher count. Similarly, words that appear in more categories will also have a higher count.

The total number of category-word pairs in the database is then counted at step 208. This total number of pairs is referred to as N. From all of these counts, the score for a given pair (c,w), which corresponds to the likelihood that the entry/word is incorrectly assigned to the category, is calculated at step 210 as:

$$\sum_{w=w1 \rightarrow wn} \log\left[\frac{J(c, w)}{C(c)W(w)}\right]$$

Once the scores for a plurality of category-word pairs have been calculated at step 210, the scores can be used to rank the pair assignments according to the likelihood that, according to the score, each assignment is correct. Sampling techniques and/or manual evaluation can then be conducted on the ordered data at step 212 to generate a curve that indicates the likelihood that a given portion of the ordered data will contain correctly categorized data, incorrectly categorized data, or marginal data (where it is unclear whether the categorization is correct or incorrect).

An example of a curve indicating the likelihood that a given portion of the ordered data will contain correctly categorized data is shown in FIG. 3. FIG. 3 illustrates an example of categorization results from various groups of samples. Note that the numbers used in FIG. 3 are for illustrative purposes only; there are no restrictions as to the sample size and depth in the inventive method. In this example, the numbers on the x-axis correspond to the depth of the sample group (for example, given 100 pairings in the ordered data, a bar graph with a position of 46 would correspond to samples that are taken from positions 1 through 46), while the y-axis corresponds with the percentage of the pairings in the sample that have correct, incorrect, or unclear category assignments. The curve corresponds to the score which, in this case, indicates the likelihood that a given portion of the data will contain correctly categorized data. In each group of bar graphs, the leftmost bar 300 indicates the percentage of clearly correct pairings in the sample, the center bar 302 indicates the percentage of clearly incorrect pairings, and the rightmost bar 304 indicates the percentage of pairings that are unclear and that may require additional examination.

The generated curve can also be used to estimate the number of incorrect assignments in a given set of data by calculating the area under the portion of the curve to be evaluated. This calculation is helpful in cases where the number of incorrect assignments is small compared to the total number of assignments. By pinpointing the data regions in which there is a greater likelihood of pairs containing incorrect assignments, any manual evaluation or examination of the data can concentrate on correcting the incorrect assignments rather than attempting to locate them among a large number of correctly assigned pairs. To help determine which data areas require closer scrutiny, the process may include selecting a threshold or cutoff point beyond which there is a high likelihood of incorrect assignments based on a predetermined level of accuracy.

Another way in which the score can be calculated is explained with reference to FIGS. 4 and 5. The process 400 in this embodiment generally counts the frequencies of occurrence and co-occurrence of the words and categories of interest, scans existing categorizations, and uses the frequency counts obtained from the counting process to compute a relevant logodds as the score corresponding to the likelihood that any given pair will contain an incorrect category assignment. In one embodiment, if the logodds (score) indicate that certain pairs have a higher likelihood of incorrect category assignment, the affected pairs can be sorted by their logodds (e.g., listing the pairs having the most negative scores first) for further review. These steps will be described in greater detail below with reference to FIG. 4.

Figure 4:
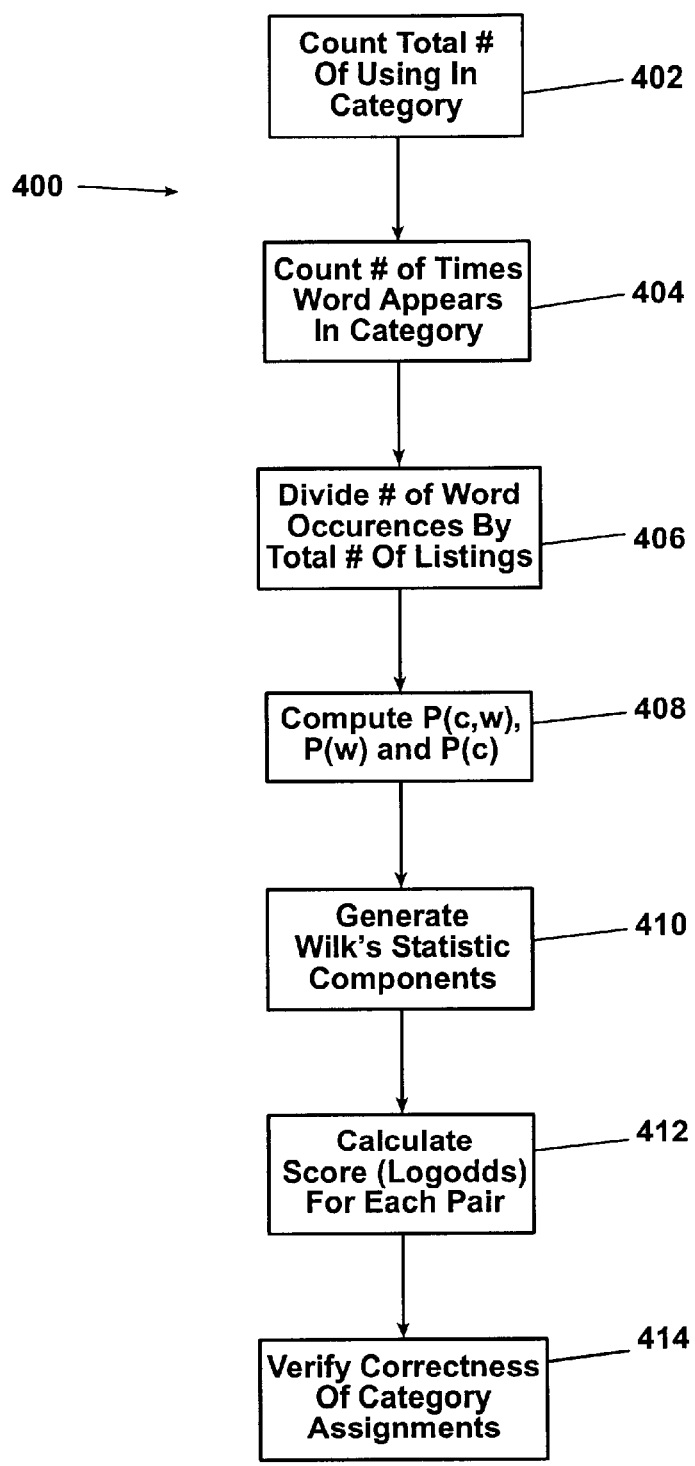
FIG. 4 is a flow diagram illustrating a score calculation process according to another embodiment of the invention.

The process 400 shown in FIG. 4 begins by determining the probability that a business name contains a particular word, assuming that the business is of a given category. This probability, notated P(w|c) and referred to as the "maximum likelihood estimate", is calculated by counting the total number of listings in the given category at step 402, counting the number of listings in the given category that contain the particular word at step 404, and dividing this number by the total number of listings at step 406. Note that other conditional probabilities P(w|~c), P(~w|c) and P(~w|~c) (i.e., the probabilities of a business having a word given that it is not of the category, etc) can also be calculated in a similar manner. Also, the corresponding joint probability P(w,c), which corresponds to the probability that a given word-category pair appears in the database, and the marginal probabilities P(w) and P(c), which correspond to the probability that a given word or category, respectively, appears in the database, can be computed at step 408 so that P(w|c)= P(w,c)/P(w).

FIG. 5 is an explanatory diagram that illustrates the basic concept used in the process of FIG. 4. FIG. 5 is a contingency table, which is often used in categorical data analysis. Each word-category pair of interest has an associated two-by-two contingency table corresponding to whether or not the entry contains a given word and whether or not the entry is in a target category. Each of the four cells of the table contains the count of entries with those combinations of features, such that the sum of the four quantities in the cells is the total number of entries in the database, such as a reference database.

Referring back to FIG. 4, a $G^2$ statistic, or "Wilk's statistic" can be generated for each word-category pair of interest as the score associated with that pair at step 410. The Wilk's statistic is effectively the logodds ratio of the best multivariate model of the data (estimating each cell count as generated by an independent probability) compared with the best independent model of the data (where the word marginal probability and category marginal probability may explain the data as well as the multivariate model). More particularly, the Wilk's statistic characterizes the degree to which the data is better described by treating the word and category as statistically dependent. The Wilk's statistic itself is calculated as follows:

$$G^2 = \sum_{c,w} NP(w, c) \log \frac{P(w, c)}{P(w)P(c)}$$

Where N is the total data size and c and w range over {c, ~c} and {w, ~w}, that is, all of the data ranging from data having category/not having catgeory and word/not word (in essence, the entire data table). Note that this quantity can be computed directly from the information in the contingency table shown in FIG. 5, where NP(w,c) is the count in the upper-right cell in the table of FIG. 5, and the ratio in the log expression is the ratio between the actual cell count P(w,c)as the numerator and the expected cell count, given word-category independence, as the denominator P(w)P(c).

Once the Wilk's statistic has been calculated for a given word-category pair, the Wilk's statistic can be used directly as a way to filter out coincidences in the data that do not help in evaluating whether a category assignment is correct. The specific amount of filtering can be set by selecting a threshold for the Wilk's statistic after reviewing the rules to be used to evaluate the entry-category pairs. More particularly, the Wilk's statistic can be used as a threshold to determine the degree to which a supposedly incorrect pairing is a chance mistake or an actual categorization error.

Components of the Wilk's statistic can also be used to evaluate word-category pairs. For instance, the "positive" diagonal pair of the contingency table which includes the cells,(has word, is category) and (does not have word, is not category) may represent positively associated words and categories (i.e., proper assignment is more likely than not), whereas the other two cells may represent a negative association (i.e., proper assignment is less likely than not).

One method currently in use is to construct the logodds of P(word|category)/P(word|not category) for each word, and to sum them for the words that occur in the business name. This can be conducted particularly efficiently for existing category assignments because only the rules relevant to that category assignment need to be considered. Effectively the invention computes the logodds of P(contains all the words|is category)/P(contains all the words|not category), so the result can be positive (i.e., proper assignment is more likely than not) or negative (i.e., proper assignment is less likely than not). A negative logodds value indicates that the data is more likely than not to be improperly categorized. Once this data is identified at step 412, the process may include further verification of the specific pair at step 414, either manually or through some other means, to confirm whether the category assignment for that pair is correct.

The result of the score calculation processes described above is a number that can be used to rank the list of entry category assignments according to the likelihood that they contain incorrect assignments. For evaluation purposes the entries having negative scores are of particular interest because it indicates likelihood that the category assignment is incorrect. Variations on the embodiment described above may include using different values for the $G^2$ cutoff using a different base logarithm (such as base 2 instead of natural log) or discarding incorrectly categorized entries based solely on the calculated score, without any separate verification step. Other variations contain the scope of the invention will be apparent to those skilled in the art.

As a result, the present invention identifies data portions that are more likely to contain inaccurate assignments, allowing user to focus on the pairs that are more likely to contain incorrectly categorized data rather than attempting to focus on all of the pairs equally. This approach will increase efficiency in checking the data, particularly in cases where there are a large number of pairs that have a relatively small number of pairs with incorrect assignments. The method can be embodied in a computer system or in a computer-readable storage medium as software.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A method for determining the accuracy of an assignment of an entry to a category, comprising the steps of:
   obtaining a database containing a plurality of entry-category pairs;
   calculating a score for each entry-category pair, wherein the score corresponds to likelihood that the entry is correctly assigned to the category;
   generating a curve based on the scores from the calculating step, wherein the curve indicates the likelihood that a given portion of the entry-category pairs contain inaccurate assignments; and
   determining a threshold point on the curve corresponding to a predetermined inaccurate categorization threshold level.

2. The method of claim 1, wherein the step of generating the curve includes the step of sampling the plurality of entry-category pairs.

3. The method of claim 2, further comprising the step of determining an area under the curve, wherein the area corresponds to a number of inaccurate assignments.

4. The method of claim 1, wherein the step of calculating the score includes the steps of:
   selecting a reference entry-category pair;
   counting a total number of times that the reference entry-category pair appear in the database; and
   counting a total number of times that each entry and each category in the reference entry-category pair appear in the database.

5. The method of claim 1, wherein the score in the calculating step for a given category is:

$$\sum_{w=w1 \to wn} \log\left[\frac{J(c, w)}{C(c)W(w)}\right]$$

wherein J(c,w) is the total number of times that a selected entry-category pair having a selected entry and a selected category appear in the database, N is the total number of pairs in the database, C(c) is the total number of pairs that the selected category appears in the database, and W(w) is the total number of pairs that the selected entry appears in the database.

6. The method of claim 4, wherein the categories are business categories and the entries are words in a business name.

7. The method of claim 4, wherein the score in the calculating step for a given entry-category pair is the ratio of the probability that a given word in the entry is in the category and the probability that the given word is not in the category.

8. The method of claim 7, wherein the entry has a plurality of words, and wherein the ratio is calculated for at least one word in the entry.

9. The method of claim 7, further comprising the step of calculating a logodds ratio of a multivariate model of the entry-category pair and an independent model of the entry-category pair expressed as:

$$G^2 = \sum_{c,w} NP(w,c)\log\frac{P(w,c)}{P(w)P(c)}$$

wherein N is the total number of entry-category pairs, P(w,c) is a probability that a selected entry-category pair having a selected entry and a selected category appears in the database, P(w) is a probability that the selected entry appears in the database, and P(c) is a probability that the selected category appears in the database.

10. The method of claim 1, wherein the categories are business categories and the entries are words in a business name.

11. The method of claim 1, further comprising are steps of:
  ordering the entry-category pairs based on their scores; and
  reviewing the entry-category pairs to detect at least one specific pair containing an inaccurate assignment.

12. A method for determining the accuracy of an assignment of an entry to a category, comprising the steps of:
  obtaining a first database containing a plurality of reference entry-category pairs;
  obtaining a second database containing a plurality of test entry-category pairs;
  calculating a score for each test entry-category pair corresponding to a comparison between the second database and the first database, wherein the score corresponds to a likelihood that the test entry is correctly assigned to the test category;
  sorting the test entry-category pairs according to the scores from the calculating step;
  generating a curve based on the scores from the calculating step, wherein the curve indicates the likelihood that a given portion of the entry-category pairs contain inaccurate assignments; and
  determining a threshold point on the curve corresponding to a predetermined inaccurate categorization threshold level, wherein a region outside of the threshold level indicates a greater likelihood of inaccurate assignments.

13. The method of claim 12 wherein the step of generating the curve includes the step of sampling the plurality of entry-category pairs.

14. The method of claim 12, further comprising the step of determining an area under the curve, wherein the area corresponds to a number of inaccurate assignments.

15. The method of claim 12 further composing the steps of reviewing the entry-category pairs associated with the region outside of the threshold level to detect at least one pair containing an inaccurate assignment.

16. The method of claim 12, wherein the step of calculating the score includes the steps of:

selecting a reference entry-category pair;
counting a total number of times that the reference entry-category pair appear in the database; and
counting a total number of times that each entry and each category in the reference entry-category pair appear in the database.

17. The method of claim 12, wherein the score in the calculating step for a given category is:

$$\sum_{w=w1\to wn} \log\left[\frac{J(c,w)}{C(c)W(w)}\right]$$

wherein J(c,w) is the total number of times that a selected entry-category pair having a selected entry and a selected category appear in the database, N is the total number of pairs in the database, C(c) is the total number of pairs that the selected category appears in the database, and W(w) is the total number of pairs that the selected entry appears in the database.

18. The method of claim 17, wherein the categories are business categories and the entries are words in a business name.

19. The method of claim 17, wherein the score in the calculating step for a given entry-category pair is the ratio of the probability that a given word in the entry is in the category and the probability that the given word is not in the category.

20. The method of 19, wherein the entry has a plurality of words, and wherein the ratio is calculated for at least one word in the entry.

21. The method of claim 19, further comprising the step of calculating a logodds ratio of a multivariate model of the entry-category pair and an independent model of the entry-category pair expressed as:

$$G^2 = \sum_{c,w} NP(w,c)\log\frac{P(w,c)}{P(w)P(c)}$$

wherein N is the total number of entry-category pairs, P(w,c) is a probability that a selected entry-category pair having a selected entry and a selected category appears in the database, P(w) is a probability that the selected entry appears in the database, and P(c) is a probability that the selected category appears in the database.

22. The method of claim 12, wherein the categories are business categories and the entries are words in a business name.

23. The method of claim 12, further comprising the step of reviewing the entry-category pairs associated with the region outside the threshold level to detect at least one pair containing an inaccurate assignment.

24. The method of claim 1, wherein the threshold value is a constant value.

25. The method of claim 24, wherein the given portion of the entry-category pairs is an entirety of the entry-category pairs.

26. The method of claim 25, wherein an X axis of the curve represents individual entry-category pairs.

* * * * *